United States Patent
Ho (10) Patent No.: US 7,757,130 B2
(45) Date of Patent: Jul. 13, 2010

(54) COMPUTER SYSTEM HAVING RAID CONTROL FUNCTION AND RAID CONTROL METHOD

(75) Inventor: Kuan-Jui Ho, Taipei (TW)

(73) Assignee: Via Technologies, Inc., Taipei (TW)

( * ) Notice: Subject to any disclaimer, the term of this patent is extended or adjusted under 35 U.S.C. 154(b) by 425 days.

(21) Appl. No.: 11/836,249

(22) Filed: Aug. 9, 2007

(65) Prior Publication Data

US 2008/0040629 A1    Feb. 14, 2008

(30) Foreign Application Priority Data

Aug. 11, 2006    (TW) .................... 095129679

(51) Int. Cl.
*G06F 11/00*    (2006.01)
(52) U.S. Cl. ........................ 714/52; 714/708
(58) Field of Classification Search .............. 714/708, 714/42, 43, 49, 52
See application file for complete search history.

(56) References Cited

U.S. PATENT DOCUMENTS

| | | | | |
|---|---|---|---|---|
| 4,107,650 A * | 8/1978 | Luke et al. | ............. | 714/762 |
| 4,833,655 A * | 5/1989 | Wolf et al. | ............. | 365/221 |
| 6,018,817 A * | 1/2000 | Chen et al. | ............. | 714/762 |
| 6,023,780 A * | 2/2000 | Iwatani | ............. | 714/770 |
| 6,192,492 B1 * | 2/2001 | Masiewicz et al. | ............. | 714/56 |
| 6,556,588 B2 * | 4/2003 | Wan et al. | ............. | 370/474 |
| 6,671,832 B1 * | 12/2003 | Apisdorf | ............. | 714/52 |
| 6,801,625 B1 * | 10/2004 | Dealy | ............. | 380/44 |
| 7,010,625 B2 | 3/2006 | Wang et al. | | |
| 7,428,693 B2 * | 9/2008 | Obuchi et al. | ............. | 714/804 |
| 7,496,656 B2 * | 2/2009 | Haydock | ............. | 709/224 |
| 7,562,284 B2 * | 7/2009 | Benhase et al. | ............. | 714/799 |
| 2003/0018851 A1 | 1/2003 | Ikeuchi et al. | | |
| 2004/0064658 A1 | 4/2004 | Chang | | |
| 2004/0268037 A1 | 12/2004 | Buchanan, Jr. et al. | | |
| 2005/0034033 A1 * | 2/2005 | Nemawarkar et al. | ......... | 714/52 |

FOREIGN PATENT DOCUMENTS

TW    200426670 A    12/2004
TW    259356        8/2006

* cited by examiner

*Primary Examiner*—Bryce P Bonzo
(74) *Attorney, Agent, or Firm*—Kirton & McConkie; Evan R. Witt (57) ABSTRACT

RAID control of multiple hard disk drives in a computer system includes performing a fault-tolerant data computing operation for a written data. The timing for performing the fault-tolerant data computing operation is determined by accessing a data stored in one of the hard disk drives, detecting a partial data length of a data stream having been transmitted from the hard disk drive to the computer system, issuing a triggering signal when the data length has reached a unitary length less than the total length of the data stream, and then performing the fault-tolerant data computing operation with the unitary length of data in response to the triggering signal.

11 Claims, 9 Drawing Sheets

COMPUTER SYSTEM HAVING RAID CONTROL FUNCTION AND RAID CONTROL METHOD

FIELD OF THE INVENTION

The present invention relates to a computer system, and more particular to a computer system having a RAID control function. The present invention also relates to a RAID control method, and more particularly to a RAID control method for use in a computer system.

BACKGROUND OF THE INVENTION

Due to the amazing power of computers, computers are widely used to implement diversified tasks such as data processing tasks, amusement-related tasks or communication tasks. With the increasing development of digitalized generation, the data storage density for the conventional data storage media might become unsatisfactory soon for receiving and storing a great amount of data. For dealing with such a problem, a single data storage medium with a very large quantity of storage capacity or a plurality of data storage media are used in a computer system. Conventionally, data stored in a data storage medium are read via a disk drive that is operated mechanically. Therefore, the operating speed of the disk drive likely fails to catch up with the high processing speed of the central processing unit (CPU). For matching the operating speed of the disk drive and the processing speed of the central processing unit, a configuration of RAID (Redundant Array of Inexpensive Disk) is proposed. In the RAID system, multiple disk drives are used to store the same data in order to increase the data transfer rate and data security. In a case that one of the multiple disk drives has a breakdown, the lost data can be restored according to an interactive encoding technology among the disk drives.

Figure 1:
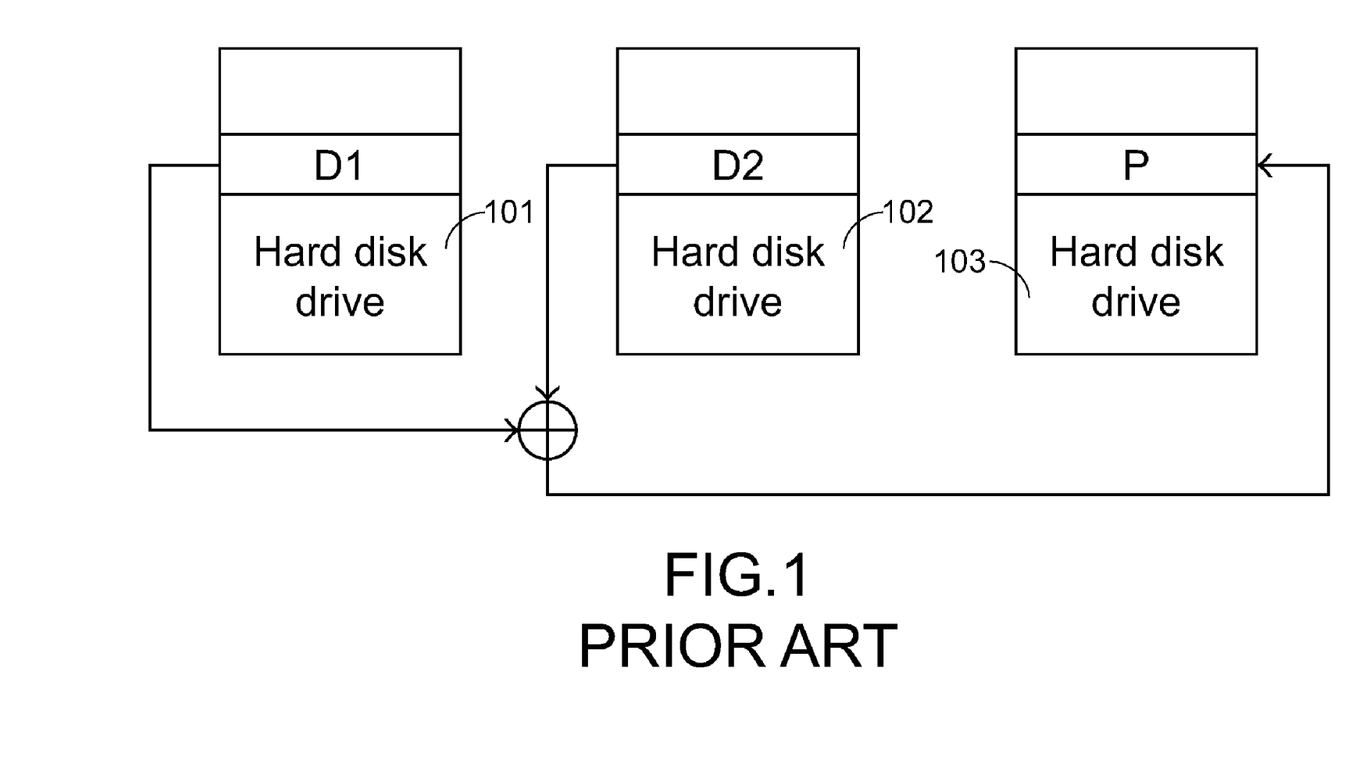
FIG. 1 is a schematic diagram of a conventional RAID configuration.

Referring to FIG. 1, a RAID configuration is schematically illustrated. The RAID system includes three hard disk drives 101, 102 and 103 and exhibits a parallel-with-parity function. The hard disk drives 101 and 102 are used to store respective data while the third hard disk drive 103 is for storing parity data obtained by operating the data in the hard disk drives 101 and 102 for securing data. For example, assuming a data D1 is stored in a first block of the hard disk drive 101, and a data D2 is stored in a second block of the hard disk drive 102, wherein the first block and the second block have the same addresses. Meanwhile, in a third block of the hard disk drive 103 having the same address as the first and second blocks, a polarity data P, which is obtained by way of an exclusive OR gate (XOR) operation of the data D1 and D2 and expressed as $P=D1\oplus D2$, is stored.

With the presence of polarity data, associated data, if lost, can be rebuilt. For example, if the hard disk drive 102 is damaged so as to lose the data D2, then the data D1 and the polarity data P can be read from the hard disk drives 101 and 103 to perform a logical XOR operation $D1\oplus P$, thereby rebuilding the data D2. In principle, all the data previously stored in the damaged hard disk drive 102 can be rebuilt based on the corresponding data in the first and third hard disk drives 101 and 103, and stored back to the hard disk drive 102 after it is fixed up. It is understood that for offering the fault-tolerant benefits of RAID, it is necessary, when a data in one of the hard disk drives is overwritten, to make additional efforts to read and write data from/to hard disk drives other than the hard disk drive actually accessed. For example, in a case that the data D1 is refreshed as D1', the data D2 stored in the hard disk drive 102 needs to be read out and subjected to a XOR operation with the data D1' to update the polarity data in the hard disk drive 103 to $P'=D1'\oplus+D2$.

Figure 2:
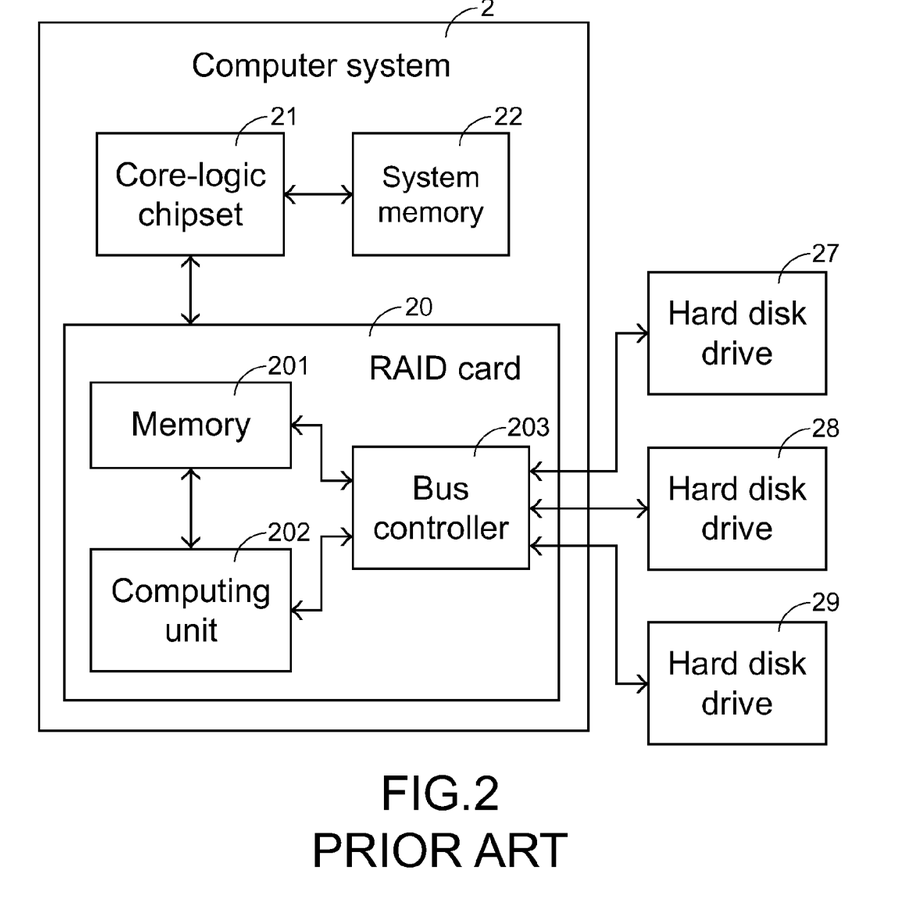
FIG. 2 is a schematic functional block diagram of a RAID card applied to a computer system according to prior art.

Since general self-supporting RAID systems are undesirable in cost and size, a cost-effective RAID card capable of being integrated into a computer casing is developed. Referring to FIG. 2, a schematic block diagram of a RAID card used with a computer system is illustrated. The RAID card 20 is to be mounted in a computer system 2 and electrically connected to a core-logic chipset 21 of the computer system 2. By executing a RAID card driver, the RAID card 20 is made communicable with the operating system of the computer system 2 for reading and writing tasks. The RAID card 20 principally includes a memory 201 serving as a data buffer, a computing unit 202 for fault-tolerant computing, and a bus controller 203. In this embodiment, the RAID card 20 is in communication with three hard disk drives 27, 28 and 29 which are accessed via the bus controller 203.

As described above, the RAID card 20 needs the memory 201 for data buffering. Generally, with the increase of the storage space of the memory 201, which is desired for the enhancement of access efficiency, the cost of the RAID card 20 undesirably increases. Then the advantages achievable by the RAID card is adversely affected For assuring of cost-effectiveness, a software RAID system with the memory 201 and the computing unit 202 being exempted from the RAID card 20 is developed. By executing RAID software, the system memory and the central processing unit of the computer system are responsible for data buffering and fault-tolerant computing. Since no additional hardware components (e.g. the memory 201 and the computing unit 202) are required, the cost of the software RAID system is reduced. The software RAID system, however, may impair the performance of the computer system because the system memory and the central processing unit of the computer system are additionally occupied to execute the RAID function.

Figure 3:
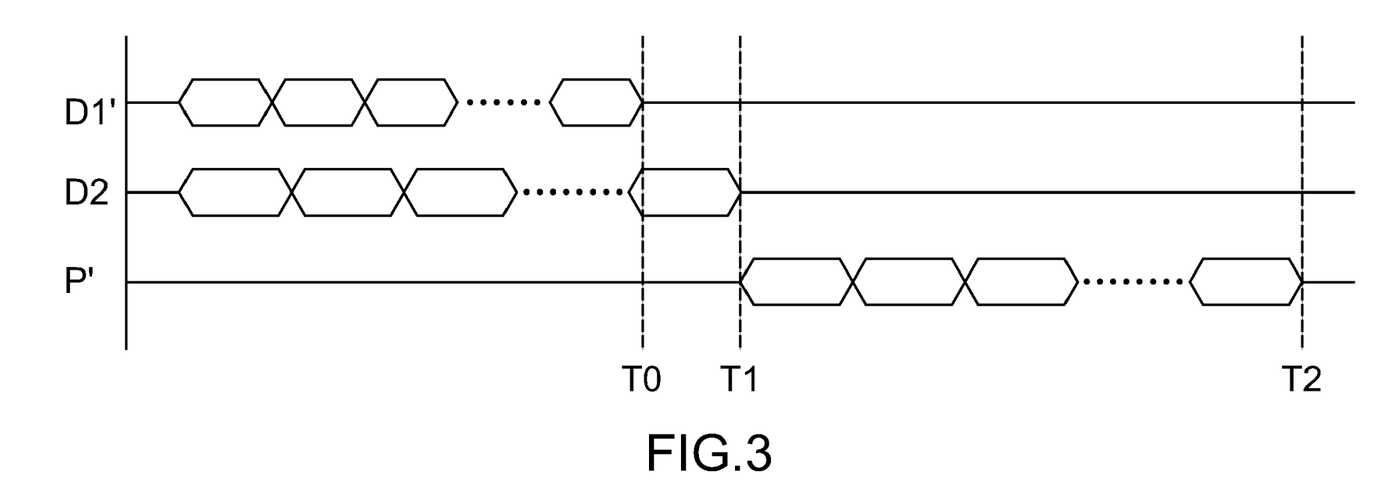
FIG. 3 is a timing waveform diagram illustrating the timing for performing an XOR operation according to prior art.

Furthermore, no matter whether a RAID system is implemented in a software fashion or a hardware fashion, it is necessary to perform the XOR logic operation as mentioned above. An example of the timing for the RAID system of FIG. 2 to execute an XOR operation is illustrated with reference to FIG. 3. In this example, the data D1 stored in the hard disk drive 27 is to be overwritten with the new data D1', thus an XOR operation of the new data D1' to be stored into the hard disk drive 27 and the corresponding data D2 stored in the hard disk drive 28 is required to update the corresponding parity data from the data P into the new data P'. For achieving this purpose, the operating system needs to write the new data D1' into the system memory 22 of the computer system 2, and write the data D2 read from the hard disk drive 28 into the memory 201 before the XOR operation can be performed to obtain the parity data $P'=D1'\oplus+D2$. As shown in the figure, the data D1' is completely written into the system memory 22 at the time point T0 and the data D2 is completely written into the memory 201 at the time point T1. Therefore, the XOR operation will not be performed until the time point T1 when the data D1' and D2 are completely transferred. As a result, the completion of the XOR operation will be as late as the time point T2. Such a processing mechanism wastes too much waiting time and is apparently inefficient.

SUMMARY OF THE INVENTION

The present invention provides a computer system having a RAID control function and a RAID control method for use with multiple hard disk drives, by which the logical XOR operation is efficiently performed so as to enhance the performance of the computer system The present invention provides a computer system having a RAID control function and operated with multiple hard disk drives, which includes a hard disk controller in communication with the hard disk drives for accessing data stored in the hard disk drives; a data length detecting unit in communication with the hard disk controller for detecting a partial data length of a data stream having been transmitted thereto from one of the hard disk drives by the hard disk controller, and issuing a triggering signal when the detected data length has reached a unitary length that is preset to be less than the total length of the data stream; and a fault-tolerant data computing unit in communication with the data length detecting unit for performing a fault-tolerant data computing operation with the unitary length of data in response to the triggering signal.

The present invention also provides a RAID control method for use in a computer system to control multiple hard disk drives, which includes steps of: accessing a data stored in one of the hard disk drives; detecting a partial data length of a data stream having been transmitted from the hard disk drive to the computer system, and issuing a triggering signal when the data length has reached a unitary length less than the total length of the data stream; and performing a fault-tolerant data computing operation with the unitary length of data in response to the triggering signal.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 4:
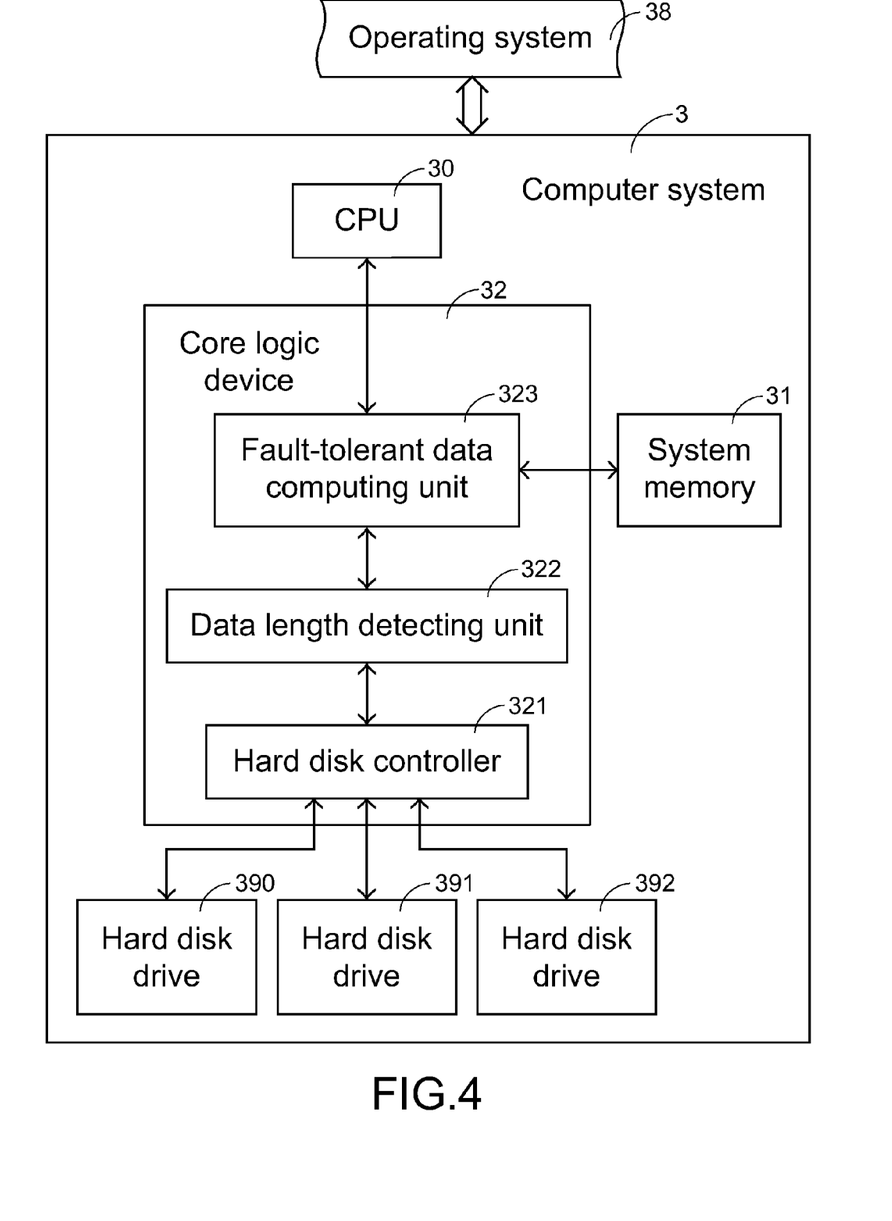
FIG. 4 is a schematic functional block diagram of a core logic device having a RAID control function according to an embodiment of the present invention.

Referring to FIG. 4, in which a computer system having RAID control means disposed in a core logic device is illustrated. The computer system 3 includes a core logic device 32 electrically connected to a central processing unit (CPU) 30, a system memory 31 and at least three hard disk drives 390, 391 and 392. The core logic device 32 includes a hard disk controller 321, a data length detecting unit 322 and a fault-tolerant data computing unit 323. For overwriting a data stored in one of the hard disk drives 390, 391 and 392 with a new data, the hard disk controller 321 implemented with, for example, an advanced host controller interface (AHCI) reads and transmits a data stream from the hard disk drive to the core logic device 32. The data length of the data stream is then detected by the data length detecting unit 322 in the core logic device 32. When the accumulated length of the received data contained in the data stream reaches a unitary length (e.g. 4 k bytes), the data length detecting unit 322 issues a triggering signal to the fault-tolerant data computing unit 323 to trigger a fault-tolerant data computing operation of the fault-tolerant data computing unit 323 (e.g. RAID3 or RAID5 exclusive-or (XOR) logic operation). The memory space required for performing the fault-tolerant data computing operation as a data buffer is provided by the system memory 31 in this embodiment.

Figure 5:
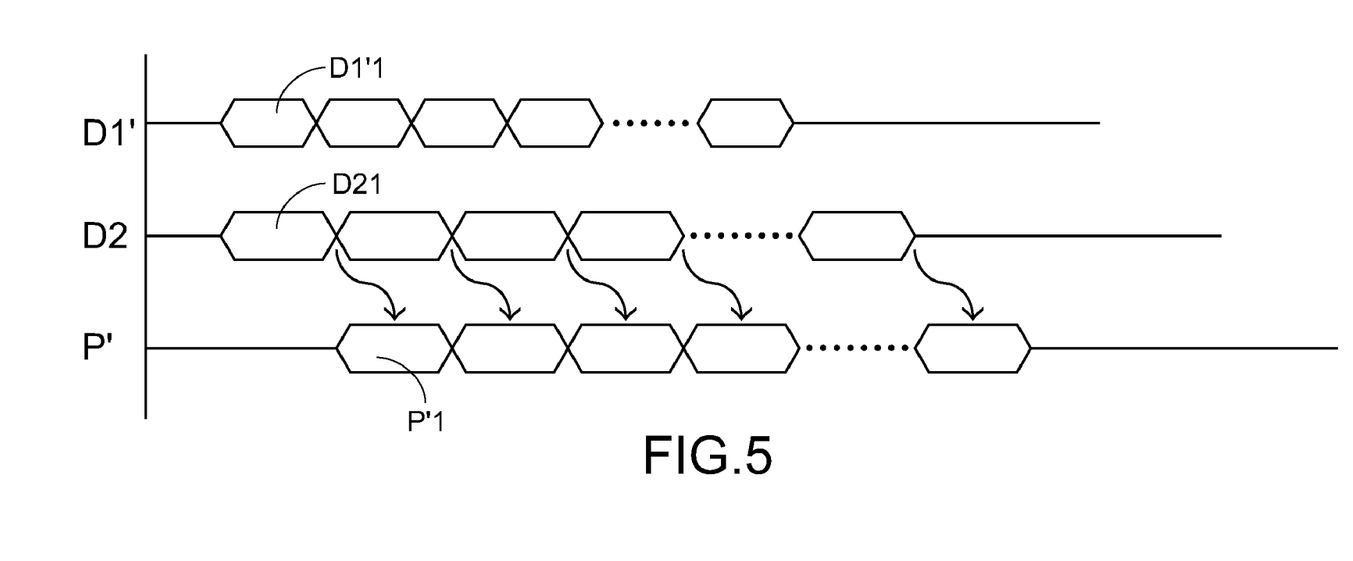
FIG. 5 is a timing waveform diagram illustrating the timing for performing an XOR operation according to an embodiment of the present invention.

The timing sequence of the data flow for the fault-tolerant data computing operation is exemplified in FIG. 5, wherein new data D1' to be written into the hard disk drive 390 to overwrite data D1 and data D2 stored in the hard disk drives 391 at an address corresponding to that of the data D1 in the hard disk drive 390 are subjected to the fault-tolerant data computing operation to obtain a new parity data P' to be stored into the hard disk drive 392 at an address corresponding to that of the data D1 in the hard disk drive 390 and that of the data D2 in the hard disk drive 391. Before the new data D1' is written into the hard disk drive 390 to overwrite the previously stored data D1, the operating system of the computer system 3 stores the new data D1' into the system memory 21 first. Meanwhile, the data D2 is transferred from the hard disk drive 391 to the memory 201. According to the embodiment as shown in FIG. 5, the XOR logic operation of the data D1' and D2 does not have to wait until all these data streams have been completely transferred to the memories. Instead, whenever a unitary length of data D1' and D2, e.g. D1' 1 and D21, are completely transferred to respective memories, the XOR operation can be timely performed to obtain a unitary length of data P' (e.g. P'1). In this way, segments of the updated data P' can be obtained immediately following the transference of corresponding segments of the data stream D1' so as to save time.

Figure 6:
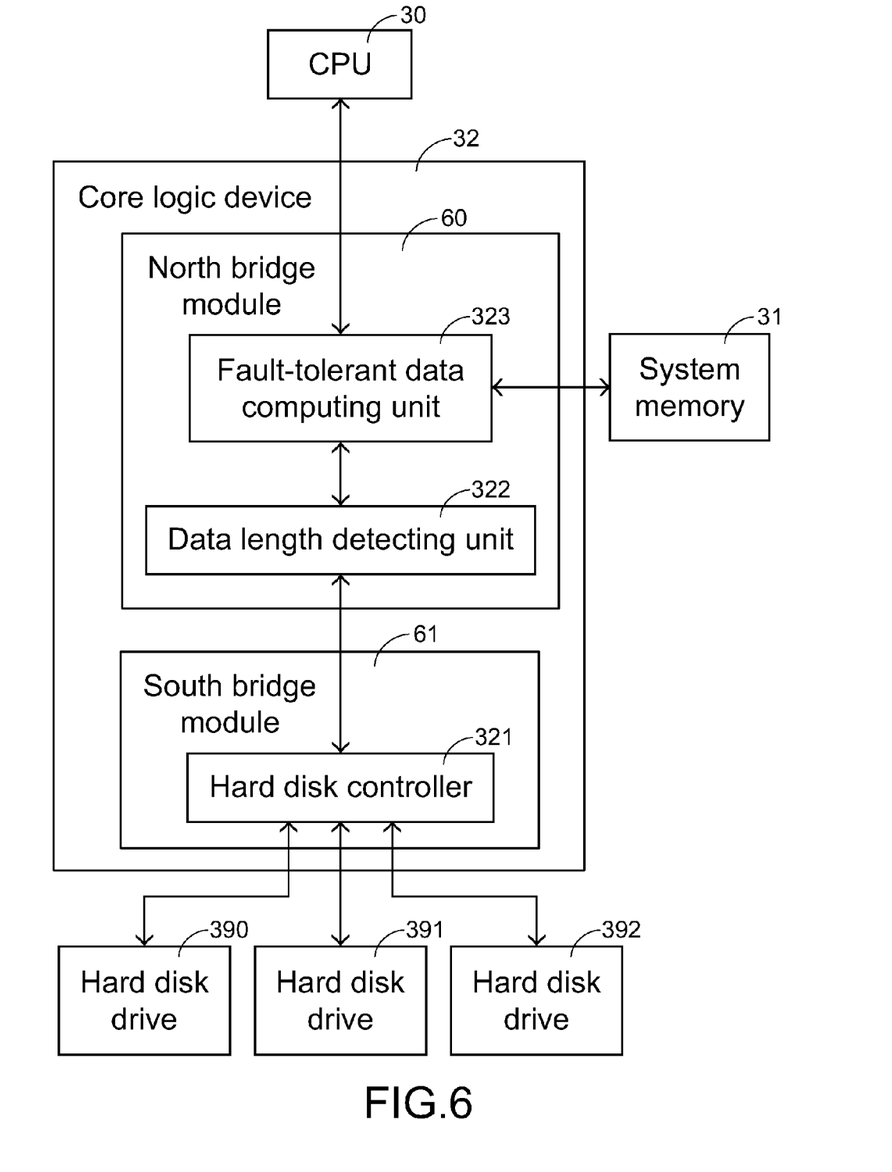
FIG. 6 is a schematic functional block diagram illustrating the allocation of RAID control means in a core logic device according to an embodiment of the present invention.

In the above embodiments, the data length detecting unit 322 employed for detecting data length is disposed in the core logic device 32. In a case that the core logic device 32 includes a north bridge module 60 and a south bridge module 61, the data length detecting unit 322 is preferably disposed in the north bridge module 60 of the core logic chip 32 as well as the fault-tolerant data computing unit 323 and the hard disk controller 321 is disposed in the south bridge module 61, as shown in FIG. 6. The RAID control method is similar to that illustrated in FIGS. 4 and 5, and not to be redundantly described herein.

Embodiments of the present invention described above are applied to RAID systems implemented in a software fashion. The present invention can also be used to improve conventional RAID systems implemented with RAID cards.

Figure 7:
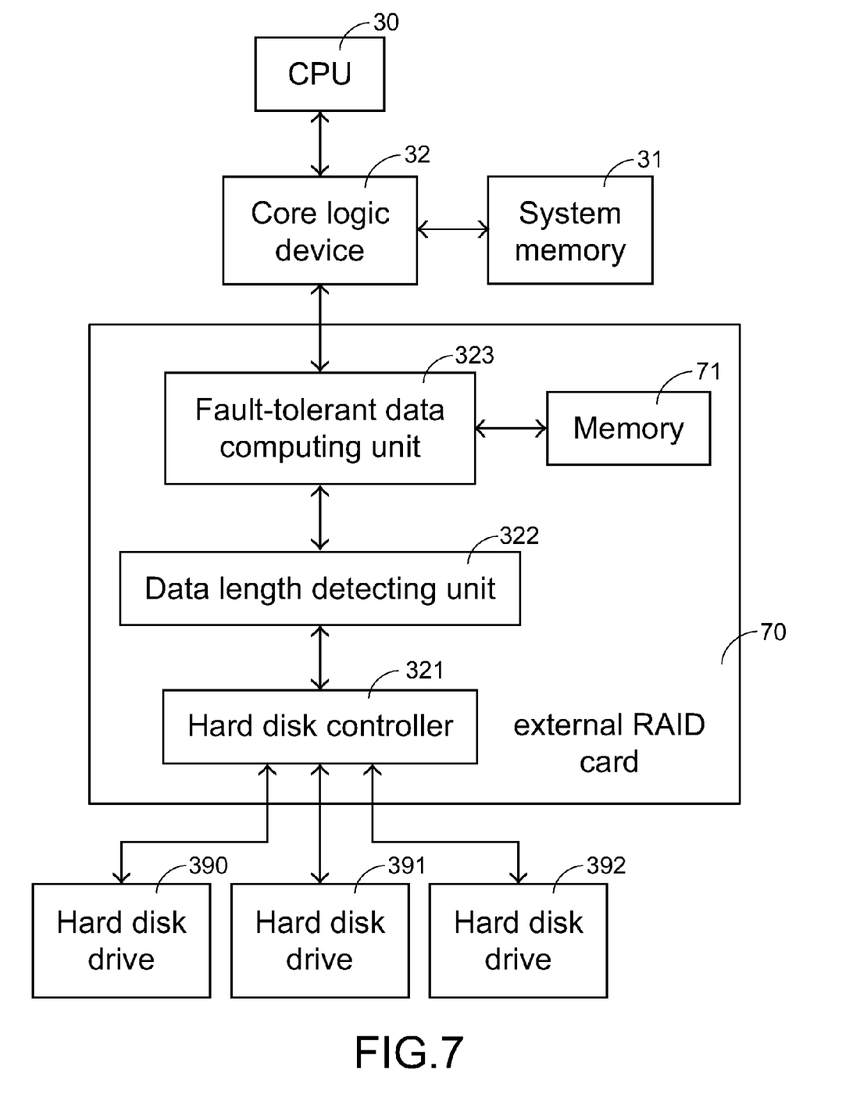
FIG. 7 is a schematic functional block diagram illustrating the allocation of RAID control means in a RAID card according to another embodiment of the present invention.

Referring to FIG. 7, the hard disk controller 321, the data length detecting unit 322 and the fault-tolerant data computing unit 323 are included in an external RAID card 70 in this embodiment. The data of the hard disk drives 390, 391 and 392 can be accessed via the hard disk controller 321 for a fault-tolerant data computing operation executed by the fault-tolerant data computing unit 323. The memory space required for performing the fault-tolerant data computing operation as a data buffer is provided by a memory 71 disposed in the external RAID card 70. The data length detecting unit 322 detects the length of the data stream transmitted from the hard disc drive (e.g. 390) to the core logic device 32. When the accumulated length of data reaches a unitary length (e.g. 4 k bytes), the data length detecting unit 322 issues a triggering signal to the fault-tolerant data computing unit 323 to trigger the fault-tolerant data computing operation, e.g. a logical exclusive-or (XOR) operation.

Figure 8:
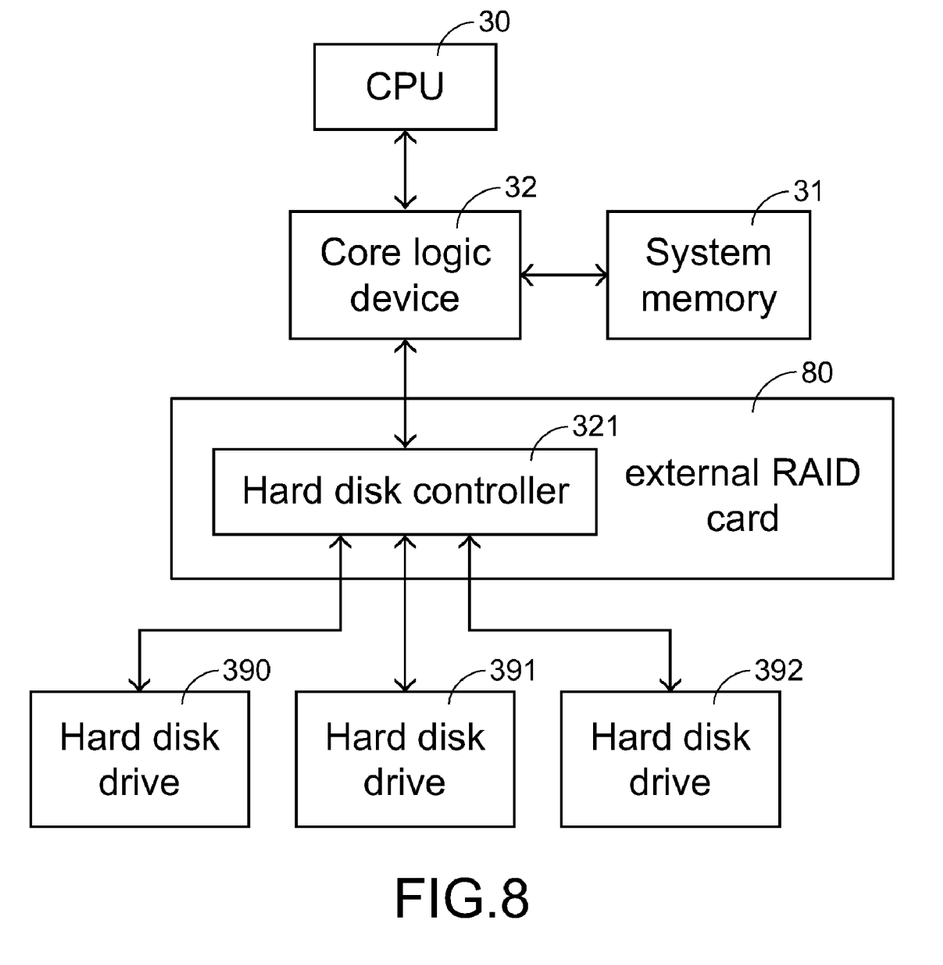
FIG. 8 is a schematic functional block diagram illustrating the allocation of RAID control means in a software RAID system according to a further embodiment of the present invention.

A further embodiment of a RAID system according to the present invention is illustrated in FIG. 8. In this embodiment, the hard disk controller 321 is included in an external RAID card 80 but the functions of the data length detecting unit and the fault-tolerant data computing unit are implemented in a software manner. Moreover, the memory space required for performing the fault-tolerant data computing operation as a data buffer is provided by the system memory 31. The RAID control method is similar to that illustrated in FIG. 7, and not to be redundantly described herein.

Figure 9:
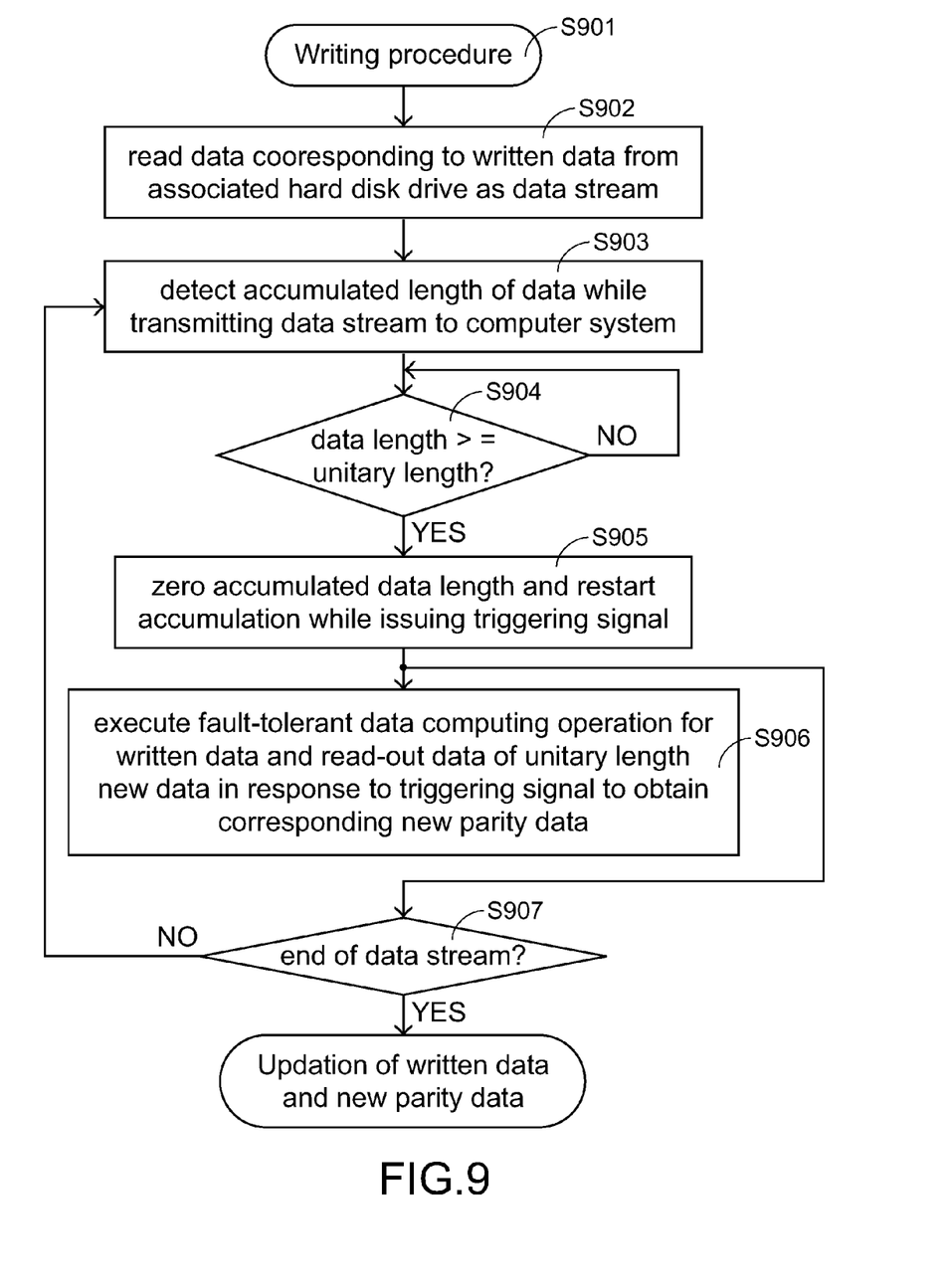
FIG. 9 is a flowchart illustrating a RAID control method according to an embodiment of the present invention.

FIG. 9 is a flowchart illustrating a RAID control method according to an embodiment of the present invention, wherein the timing for executing a fault-tolerant data computing operation is specifically defined to improve efficiency. When a new data is to be written into one of the hard disk drives in the RAID system (S901), it is necessary to perform a fault-tolerant data computing operation of the new data and a corresponding data in another hard disk drive, e.g. an XOR logic operation, to update the corresponding parity data stored in the other hard disk drive. For performing the fault-tolerant data computing operation, the corresponding data is read out from the associated hard disk drive as a data stream (S902). While the data stream is being transmitted from the associated hard disk drive to the computer system, the accumulated length of data is detected (S903). When the data length is detected to exceed a unitary length (S904), zero the data length to restart accumulation while issuing a triggering signal (S905). In response to the triggering signal, the fault-tolerant data computing operation is executed for the read-out data of the unitary length and the new data (S906). Steps S903~S906 are repeated until the end of the data stream (S907). Thus the new written data and the new parity data can be stored in respective hard disk drives (S908).

The RAID system and control method according to the present invention can also be applied to the restoration of data stored in a damaged hard disk drive, which also requires a fault-tolerant data computing operation. Corresponding data are read out from two hard disk drives associated with the damaged hard disk drive to be subjected to the fault-tolerant data computing operation. The accumulated length of data being transmitted is detected. The fault-tolerant data computing operation is performed whenever the data length exceeds a unitary length rather than until both the data streams are completely transferred into the memory. In this way, the data restoration efficiency can be improved.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A computer system having a RAID control function and operated with multiple hard disk drives, comprising:
   a hard disk controller in communication with the hard disk drives for accessing data stored in the hard disk drives;
   a data length detecting unit in communication with the hard disk controller for detecting a partial data length of a data stream having been transmitted thereto from one of the hard disk drives by the hard disk controller, and issuing a triggering signal when the detected data length has reached a unitary length that is preset to be less than the total length of the data stream; and
   a fault-tolerant data computing unit in communication with the data length detecting unit for performing a fault-tolerant data computing operation with the unitary length of data and a written data in response to the triggering signal to obtain a corresponding parity data;
   wherein the unitary length of data, the written data, and the corresponding parity data are stored in different hard disk drives at correlating addresses.

2. The computer system according to claim 1 wherein the hard disk controller is an advanced host controller interface (AHCI).

3. The computer system according to claim 1 wherein the hard disk controller is disposed in a south bridge module of a core logic device.

4. The computer system according to claim 1 wherein the data length detecting unit and the fault-tolerant data computing unit are disposed in a north bridge module of a core logic device.

5. The computer system according to claim 1 wherein the fault-tolerant data computing operation is an exclusive-or (XOR) logic operation.

6. The computer system according to claim 1 wherein the hard disk controller is disposed in an external RAID card.

7. The computer system according to claim 1 wherein the data length detecting unit and the fault-tolerant data computing unit are disposed in an external RAID card.

8. The computer system according to claim 1 wherein the data length detecting unit and the fault-tolerant data computing unit are disposed in a core logic device.

9. A RAID control method for use in a computer system to control multiple hard disk drives, comprising steps of:
   accessing a data stored in one of the hard disk drives;
   detecting a partial data length of a data stream having been transmitted from the hard disk drive to the computer system, and issuing a triggering signal when the data length has reached a unitary length less than the total length of the data stream; and
   performing a fault-tolerant data computing operation with the unitary length of data and a written data in response to the triggering signal to obtain a corresponding parity data;
   wherein the unitary length of data, the written data, and the corresponding parity data are stored in different hard disk drives at correlating addresses.

10. The RAID control method according to claim 9 wherein the fault-tolerant computing operation is an exclusive-or (XOR) logic operation.

11. The RAID control method according to claim 9 wherein the detected data length is zeroed once the triggering signal is issued.

* * * * *